UNITED STATES PATENT OFFICE.

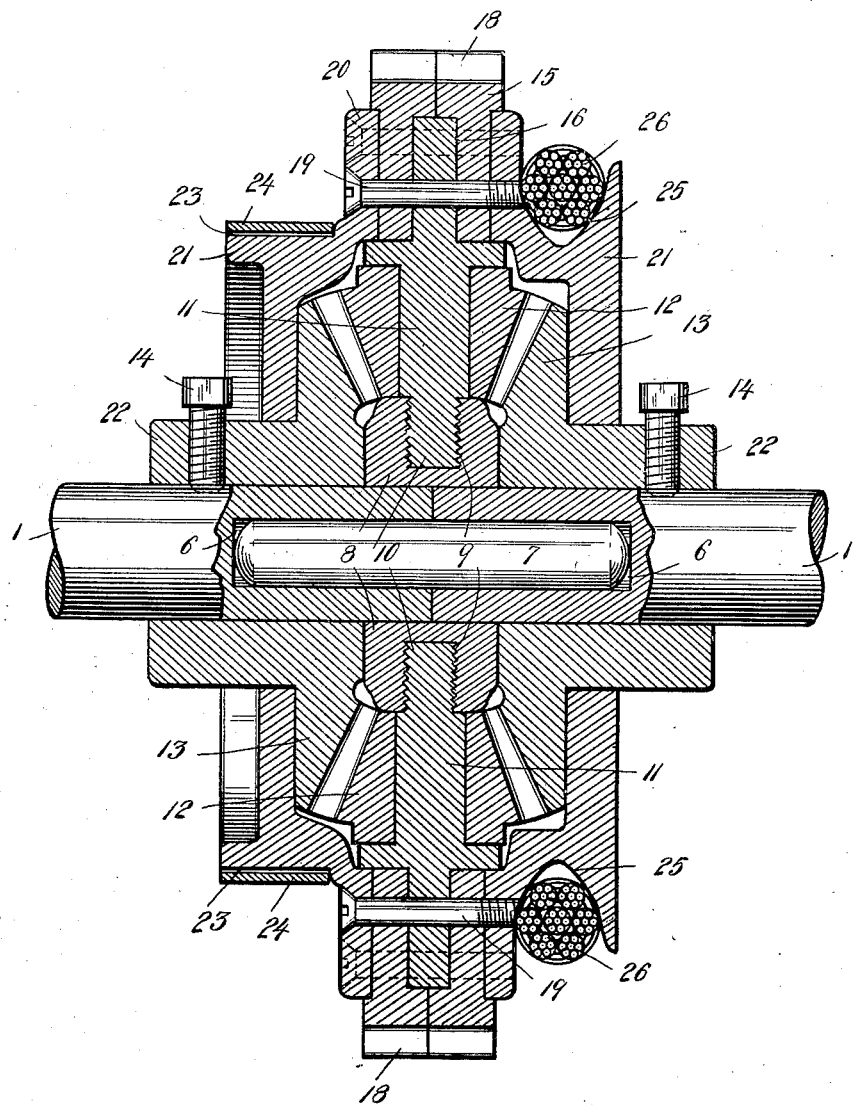

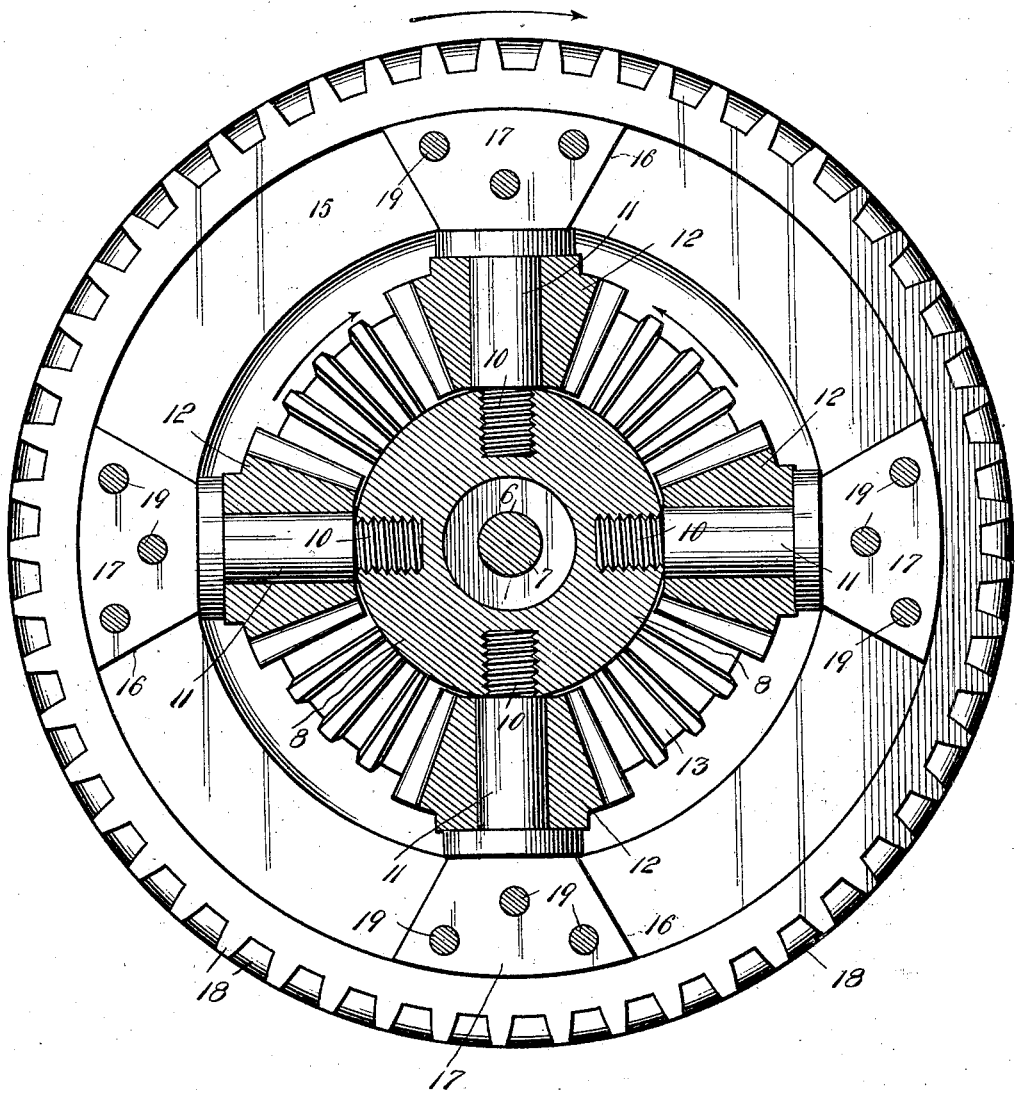

CHARLES F. ALLEN, OF HUENEME, CALIFORNIA, ASSIGNOR OF ONE-HALF TO L. B. HOGUE AND W. C. HEWITT, OF SANTA PAULA, CALIFORNIA.

DRIVING-GEAR.

SPECIFICATION forming part of Letters Patent No. 696,704, dated April 1, 1902.

Application filed August 4, 1900. Serial No. 25,947. (No model.)

*To all whom it may concern:*

Be it known that I, CHARLES F. ALLEN, a citizen of the United States, residing at Hueneme, in the county of Ventura and State of California, have invented new and useful Improvements in Driving-Gear, of which the following is a specification.

My invention relates to improved driving-gear especially designed for use upon automobiles and similar vehicles; and the object is to provide a divided rear axle of the vehicle with a differential gear which will rotate the respective sections or parts of the axle so that the wheels may turn at varying speeds when turning corners or accomplishing curves.

With this object in view the invention consists in the novel construction of parts and their operative aggroupment in combination, as will be hereinafter fully specified and particularly pointed out and distinctly claimed.

I have fully and clearly illustrated the improvements in the accompanying drawings, to be taken as a part of this specification, and wherein—

Figure 1 is a vertical transverse sectional view showing the gearing mounted on the divided axle and the parts or elements as in operative relation. Fig. 2 is a view in elevation, partly in transverse and longitudinal vertical section.

Referring to the drawings, 1 designates the axle upon which the improved differential gear is mounted, which axle is designed to represent the rear axle of a road-vehicle and to be carried by proper wheels (not shown) in the well-known manner. The axle 1 is made in two parts or sections, as shown in Fig. 1, each of which is formed with a socket in its inner end, as at 6, in which is loosely arranged a bearing-pin 7. This bearing-pin extends a suitable distance into the adjacent and abutting ends of the axle-sections and constitutes a bearing therefor and at the same time holds the parts in relative alinement with each other. A sleeve 8 is loosely mounted upon the abutting end portions of the axle 1, and this sleeve is formed with a suitable number, preferably four, of screw-threaded sockets 9, each of which is adapted to receive the correspondingly-threaded stems 10 of a bearing-pin 11. Loosely mounted on each of these bearing-pins 11 is a beveled pinion 12, which is arranged to mesh with oppositely-arranged beveled face-gears 13, mounted on the axle. One of these gears 13 is secured to each section of the axle 1, near the inner end thereof, preferably by set-screws 14, and formed so as to fit snugly upon opposite sides of the sleeve 8, as indicated. A ring 15, comprising duplicate parts or sections, incloses the pinions 12, and each of these sections is recessed in its inner face, as shown at 16, for the reception of the flattened heads 17 of the bearing-pins 11, as shown. The united sections of the ring 15 are formed on their outer faces or perimeters with V-shaped teeth 18, constituting a tangential gear. This gear or ring comprises duplicate rings bound together by bolts 19, which pass through the heads 17, as shown in the drawings. These bolts, it will be understood, not only serve to bind the two parts of the gear together, but also to retain the heads 17 in position. The bolts 19 also engage annular flanges 20, formed at the inner edges of collars 21, which project over the pinions 13 and bear upon the sleeves or hubs 22 thereof. These collars 21 are loosely mounted upon the sleeves 22 and revolve thereon, and one of them is provided with a flat periphery or face 23, which is adapted to receive a suitable brake-band 24, which may be operated in any desired manner. The opposite collar 21 is preferably provided with an annular groove 25 in its periphery, and in this groove is arranged a cable 26, which is operated in any suitable manner and serves the purpose of a brake. It will be perceived that these collars not only serve the purpose of brakes, but also fasten the parts of the gear in proper relation to each other and protect the interior mechanism from dust, &c.

The toothed ring 18 of the differential gear is locked to the axle by the pinions 12, which mesh with the oppositely-disposed beveled gears 13. By this arrangement of the gears 12 and 13, however, it will be understood that the two sections of the axle 1 will be free to revolve in opposite directions, and this will obviously permit the two traction or carrying wheels upon the axle to revolve at different speed when turning corners or when the vehicle is being turned around, thus preventing sliding, as in devices employing a revolving axle made in a single piece.

Motion may be imparted to the gear by any suitable power-driven pinion or gear meshing with the teeth thereof.

What I claim is—

1. The combination with an axle formed of two similar sections; of a pin loosely mounted within the adjacent end of said sections, a beveled pinion secured to each section near the inner end thereof, a sleeve loosely mounted upon the sections between the pinions, pins detachably secured to the sleeve and formed with projecting flattened heads, a gear mounted upon each pin and engaging both pinions, a toothed ring secured to the heads of the pins and surrounding the axle, and collars secured to opposite sides of the ring and inclosing the pinions.

2. The combination with an axle formed of two similar sections; of a pin loosely mounted within the adjacent ends of the sections, a beveled pinion secured to each axle-section near the inner end thereof, a sleeve loosely mounted upon the sections and between the beveled pinions, pins extending from and detachably secured to the sleeve and having projecting flattened heads, gears mounted upon the pins and engaging both pinions of the axle, a gear formed of two similar rings secured to the heads of the pins and surrounding the axle, and a collar secured to each ring and inclosing the pinions, one of said collars having a grooved periphery.

3. The combination with an axle formed of two similar sections; of a pin loosely mounted within the adjacent ends of said sections, a pinion secured to each section near the inner end thereof, a sleeve loosely mounted upon the sections between the pinions, pins detachably secured to and extending from said sleeve, a gear mounted upon each pin and engaging both pinions, each pin having a flattened head, a sectional toothed ring having on the inner face of each section a recess for the reception of said heads, said ring formed of two similar rings, collars at opposite sides of the toothed ring and inclosing the pinions, and means for binding the collars, the rings, and the heads of the pins together.

In testimony whereof I affix my signature in presence of two witnesses.

CHARLES F. ALLEN.

Witnesses:
F. W. GERBERDING,
A. B. SMITH.